Patented Dec. 2, 1941

2,264,593

UNITED STATES PATENT OFFICE 2,264,593

MAYONNAISE AND METHOD OF MANUFACTURING SAME

Abraham Schapiro, Chicago, Ill.

No Drawing. Application May 26, 1939,
Serial No. 275,796

16 Claims. (Cl. 99—144)

This invention relates to food products and to methods for producing the same and more particularly to stable, substantially non-fermentable, emulsified food products.

In the following description of my invention, I will refer, particularly and by way of example only, to mayonnaise and mayonnaise manufacture; however, it is to be understood that my invention is applicable also to similar food products as hereinafter more fully set forth.

Mayonnaise is an oil-in-water type of emulsion containing essentially an oil, olive, cottonseed, peanut, corn, or like edible oil, or mixtures thereof, egg yolk and water; the emulsifying agent being usually a certain constituent of the egg yolk or the combination thereof with an added emulsifying agent. Salt, vinegar and spices are usually added to impart a desirable flavor and aroma to the mayonnaise and to prevent undesirable fermentations.

In the manufacture of mayonnaise in accordance with prior art methods, it has been necessary to limit the amount of water used in order to maintain the desired stability of the emulsion and the effectiveness of the salt and vinegar as preservatives and flavor imparting constituents. In general, mayonnaise prepared in accordance with prior art methods contained no more than about 15% by weight of water and usually the amount of water was limited to about 12% to about 14.5% by weight since above that amount the emulsion was rendered unstable and separation of the water took place. The use of substances which carry into mayonnaise larger amounts of water, in excess of about 15% by weight, is desirable because it is possible thereby to produce an emulsion of smoother consistency and otherwise desirably alter the mayonnaise.

In order to maintain the keeping qualities of mayonnaise containing from about 12% to about 15% of water, it has been necessary to use larger amounts of strong vinegar in excess of the amount required from the standpoint of flavor and aroma. One the basis of acid content, this amount was in the order of at least about 2% to 3% by weight of the water present in the mayonnaise. While this high vinegar content is desirable from one standpoint, viz. as a preservative, such excess of vinegar is undesirable because it imparts to the mayonnaise a high puckering taste and sharpness which limits the amount of dressing that can be used. In addition, this high vinegar content together with the salt and other electrolytes used in mayonnaise cause the emulsion to break down on standing.

In accordance with the present invention, I have found that the above and other disadvantages in mayonnaise and mayonnaise manufacture are overcome by utilizing a non-toxic monochloracetic acid compound as a constituent of mayonnaise. By operating in accordance with the present invention, I have produced mayonnaise with a water content in the order of about 20% to 25% and even higher and with a very low acid content in the order of about 0.5% to about 1.5% based on the water content. The mayonnaise so produced has a smooth creamy consistency and is stable against break down and development of undesirable fermentations and mold growth on standing for three to six months and even up to a year and longer. It has none of the sharpness and high puckering taste which is characteristic of the high acid content mayonnaise of the prior art. Furthermore, by operating in accordance with my invention it is possible to increase the amount of egg yolk beyond that capable of being heretofore used in mayonnaise and also to make use of the egg whites. Heretofore, egg whites could not be used in mayonnaise because of the high water content thereof and the fact that egg whites deteriorate and spoil rapidly. By my invention, substantial savings in costs of manufacture are effected because by the aid thereof it is possible to utilize the whole egg. Mayonnaise containing the whole egg, when produced in accordance with my invention, is substantially as stable as the mayonnaise of my invention containing the egg yolk only.

The monochloracetic acid compound used in accordance with my invention may be suitably monochloracetic acid or other non-toxic water and/or alcohol soluble monochloracetic acid compound such as, for example, the ethyl, glycol and glycerol esters of monochloracetic acid; the sodium or other alkali metal salts of monochloracetic acid; calcium monochloracetate and like alkaline earth salts; and the like, or any mixture thereof. Other esters and salts of monochloracetic acid as well as the aldehydes, ketones and ethers of this acid may likewise be used as may also the water-soluble monochloraliphatic acids having from 3 to 5 carbon atoms in the chain and the non-toxic water and/or alcohol soluble derivatives thereof.

In my preferred practice, I utilize a novel monochloracetic acid compound which may be formed by reacting one of the monochloracetic acid compounds referred to above, for example, monochloracetic acid, with a material which in solution is capable of setting to a solid, rubbery gel. Of course, for the present purposes, the gelable material must be edible and non-toxic. This gelable material may be suitably gelatin, agar, Irish moss, pectin, starch, algins and alginates or like materials which in solution are capable of setting to a solid, rubbery, gel-like form. For the sake of convenience, this novel monochloracetic acid compound will be referred to hereinafter as "reaction product."

The reaction may be carried out in any suitable vessel, for example, a glass-lined, stainless steel or like acid-resisting steam jacketed container. The reaction product may be formed by causing the gelatable material to react with an aqueous solution of a monochloracetic acid compound while subjecting the reactants to temperatures in excess of room temperature, preferably temperatures in the order of about 180° F. up to about 250° F. In general, the temperature of the reactants should be maintained below the charring point of the gelatable material utilized. While the concentration of the monochloracetic acid compound in the water may vary rather widely, as desired, I prefer to use rather concentrated solutions in the order of about 50 to 75% since the reaction takes place more readily in these higher concentrations. The quantity of the gelatable material in respect of the monochloracetic acid compound (dry bases) may vary rather widely in the order of about, for example, ⅓ to about 3 parts by weight of the gelatable material to one part of the monochloracetic acid compound, preferably, equal weights.

The following is an example of one method of forming a reaction product in accordance with the present invention. In the following example, and in all other examples in this application, it is, of course, to be understood that the invention is not to be construed as limited to the specific details disclosed in the examples since these details may obviously be varied without departing from the scope of the invention disclosed herein.

*Example A*

10 parts by weight of gelatin are mixed with 20 parts by weight of a 50% aqueous solution of monochloracetic acid and subjected to a temperature in the order of about 190° F. to about 210° F. for about 5 minutes.

The reaction product may be removed from the reaction vessel and used as such as a constituent of the mayonnaise or it may be dried and granulated or powdered and stored for use. If desired, the reaction product may be formed in situ during the process of manufacturing the mayonnaise.

In practicing my invention, the monochloracetic acid compound or the reaction product or a mixture thereof may be introduced or mixed with the other mayonnaise ingredients at any of the stages of the processes commonly practiced in making mayonnaise. I prefer, however, to mix the compound or the reaction product with the spices, or with the vinegar during the process of preparing the spiced vinegar, which is a stage in the process of preparing mayonnaise preliminary to the ingredient mixing operations. In the event that the mayonnaise includes a prepared spice extraction or extract as an ingredient thereof, the compound or reaction product or mixture thereof in accordance with my invention may be mixed preliminarily with the spice extraction or extract.

The quantity of the non-toxic monochloracetic acid compound or of the reaction product, in respect of the other ingredients of the mayonnaise, which may be used in accordance with my invention may vary rather widely to meet any desired need. In general, the unreacted monochloracetic acid compound is more effective in maintaining the keeping qualities of the mayonnaise than the reaction product and hence lesser amounts of the former may be used. For most purposes, from about 0.02% to about 0.05% by weight of the total constituents is sufficient in respect of the unreacted compound and from about 0.05% to about 0.20% is sufficient in respect of the reaction product.

The following mayonnaise formulas illustrate my invention. In the formulas, the term "parts" refers to parts by weight:

*Example 1*

| | Parts |
|---|---|
| Egg yolk | 120 |
| Cottonseed oil | 330 |
| Spice mixture (containing salt) | 24 |
| Cider vinegar (45 grains) | 160 |
| Monochloracetic acid | 0.25 |

*Example 2*

| | Parts |
|---|---|
| Whole egg | 120 |
| Corn oil | 330 |
| Spice mixture (containing salt) | 24 |
| Cider vinegar (45 grains) | 160 |
| Reaction product (Example A) | 1.25 |

*Example 3*

| | Parts |
|---|---|
| Egg yolk | 80 |
| Corn oil | 275 |
| Cider vinegar (45 grains) | 45 |
| Sugar | 10 |
| Mustard powder | 4 |
| Salt | 6 |
| White pepper | 1.5 |
| Monochloracetic acid | 0.16 |

*Example 4*

| | Parts |
|---|---|
| Egg yolk | 7.5 |
| Cotton seed oil | 33.0 |
| Spice mixture (containing salt) | 2.0 |
| White distilled vinegar (45 grains) | 5.0 |
| Water | 5.0 |
| Malic acid | 0.1 |
| Monochloracetic acid | 0.02 |

*Example 5*

| | Parts |
|---|---|
| Egg yolk | 80 |
| Corn oil | 275 |
| Lemon juice | 32 |
| Water | 13 |
| Sugar | 10 |
| Mustard powder | 4 |
| Salt | 6 |
| White pepper | 1.5 |
| Monochloracetic acid | 0.16 |

By the use of monochloracetic acid compounds in accordance with my invention, it is possible to substitute fruit acids or citrous juices for part or all of the vinegar of the mayonnaise, without impairing the keeping qualities of the mayonnaise. Thus, for example, malic acid, tartaric acid, citric acid, citrous juices, or combinations thereof may be substituted for part of the vinegar as in Examples 4 and 5 to impart a more desirable and superior flavor to the mayonnaise. Heretofore, this has not been possible except at the expense of limiting and, in many instances, destroying the keeping qualities of the mayonnaise.

In general, mayonnaise prepared in accordance with my invention is of a uniform and creamy consistency and is capable of being stored for long periods of time, in the order of six months to one year and even longer, without break-down. On the other hand, mayonnaise prepared in accordance with prior art methods do not, in general, maintain the desired uniform, homogeneous, emulsified form over long periods of time and usually break-down on standing in from about 30 to 60 days. Mayonnaise in accordance with my invention has a depressed freezing point and a consequently increased frost-resisting capacity, thereby enabling it to withstand comparatively low freezing temperatures, even for rather long periods of time, without break-down of the emulsion. Usually the prior art mayonnaise emulsions break as a result of having been subjected to low freezing temperatures.

An outstanding advantage flowing from the use of the reaction product in accordance with my invention is that it imparts an enhanced stabilization against break-down to edible emulsions containing it. It appears that the reaction product is an excellent emulsifier and stabilizer. By the use of the reaction product, in particular, in mayonnaise emulsions, I am enabled to use larger relative amounts of the moisture bearing substances, such as, for example, egg yolk, than heretofore; or even use the whole egg and obtain a mayonnaise emulsion which is more stable against break-down, undesirable fermentation and mold development than the prior known mayonnaise emulsions. In general, by the use of the monochloracetic acid compounds or reaction product in accordance with my invention, mayonnaise manufacture is made more flexible and less expensive in that a wider choice of ingredients and proportions thereof may be utilized. Moreover, the resulting products have an unusually desirable flavor, taste and aroma.

While in the description of my invention I have referred particularly to mayonnaise and mayonnaise manufacture, it is, of course, to be understood that my invention is also applicable to salad dressings, food spreads, for example, cheese and sandwich spreads, margarine, as well as like emulsified food products, and in relishes, mustard and the like.

In the manufacture of ice cream or ice cream mixes, for example, I have found that the monochloracetic acid compounds and, in particular, the reaction product, in accordance with my invention, are excellent foam-producing agents, superior to gelatin. Ice creams prepared with the aid of the monochloracetic acid compounds have a very desirable over-run and exhibit substantially none of the "sandiness" which is characteristic of many of the high solids not fat content ice cream. I have also found that ice cream prepared in accordance with my invention is extremely stable even when subjected to sudden temperature changes or other shocks. By preparing ice cream in accordance with my invention, I am enabled to hold down the bacterial count of the ice cream to a minimum.

The calcium salt of monochloracetic acid is a particularly desirable compound for use in food products because it is readily soluble in water and provides a readily available source of calcium. Within the digestive tract, this compound is readily hydrolyzed to calcium and a compound which reacts to form glycine. In consequence, this compound lends itself for use as a therapeutic agent. It may be incorporated in emulsified food products as described above, or, if desired, in other edible carriers such as liquid or powdered whole or skim milk, chocolate, edible mineral, animal and vegetable oils, gelatin and the like.

The expression "monochloracetic acid compound" as used in the specification and claims is intended to include the reaction products formed by reacting a monochloracetic acid compound with a material which in solution is capable of setting to a solid, rubbery gel as described hereinabove.

I claim:

1. An emulsified food product of the non-beverage type containing a non-toxic monochloracetic acid compound and stabilized thereby.

2. An emulsified food product containing the product formed by reacting a non-toxic monochloracetic acid compound with a material, which in solution is capable of setting to a solid rubbery gel, at temperatures below the charring point of the material, said food product being stabilized by said reaction product.

3. An emulsified food product of the non-beverage type containing monochloracetic acid and stabilized thereby.

4. Salad dressings containing a non-toxic monochloracetic acid compound and stabilized thereby.

5. Mayonnaise containing a non-toxic monochloracetic acid compound and stabilized thereby.

6. As a new article of manufacture, mayonnaise containing whole egg and a non-toxic monochloracetic acid compound, said mayonnaise being stabilized by said compound.

7. Mayonnaise having a water content in excess of about 20% by weight and containing a non-toxic monochloracetic acid compound, said mayonnaise being stabilized by said compound.

8. Mayonnaise containing monochloracetic acid and stabilized thereby.

9. A low vinegar content mayonnaise containing a fruit acid and a non-toxic monochloracetic acid compound, said mayonnaise being stabilized by said compound.

10. Mayonnaise containing citrus juice and having present therein a non-toxic monochloracetic acid compound, said mayonnaise being stabilized by said compound.

11. Ice cream containing monochloracetic acid and stabilized thereby.

12. Ice cream containing a product formed by reacting monochloracetic acid with gelatin at a temperature below the charring point of the gelatin, said ice cream being stabilized by said reaction product.

13. As a new article of manufacture, a reaction product formed by reacting a non-toxic monochloracetic acid compound with a gelable material at a temperature below the charring point of the material.

14. As a new article of manufacture, a reaction product formed by reacting monochloracetic acid with gelatin at a temperature below the charring point of the gelatin.

15. Mayonnaise containing a naturally occurring food acid and having present therein a non-toxic monochloracetic acid compound, said mayonnaise being stabilized by said compound.

16. An edible carrier of the non-beverage type containing a non-toxic, water-soluble monochloracetic acid compound and stabilized thereby.

ABRAHAM SCHAPIRO.